United States Patent
Geither et al.

(10) Patent No.: US 10,862,371 B2
(45) Date of Patent: Dec. 8, 2020

(54) PERIMETER LIQUID-COOLED ELECTRIC MACHINE AND INTEGRATED POWER INVERTER

(71) Applicant: Bendix Commercial Vehicle Systems LLC, Elyria, OH (US)

(72) Inventors: Jeffrey Geither, North Ridgeville, OH (US); David Colavincenzo, Castalia, OH (US); Fernando Venegas Diaz, Castalia, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 117 days.

(21) Appl. No.: 16/220,949

(22) Filed: Dec. 14, 2018

(65) Prior Publication Data
US 2020/0195094 A1 Jun. 18, 2020

(51) Int. Cl.
| | |
|---|---|
| H02K 9/19 | (2006.01) |
| H02K 11/33 | (2016.01) |
| B60K 6/26 | (2007.10) |
| H02K 5/22 | (2006.01) |
| H02K 7/00 | (2006.01) |
| H02K 5/20 | (2006.01) |

(52) U.S. Cl.
CPC .......... *H02K 9/19* (2013.01); *B60K 6/26* (2013.01); *H02K 5/20* (2013.01); *H02K 5/225* (2013.01); *H02K 7/006* (2013.01); *H02K 11/33* (2016.01)

(58) Field of Classification Search
CPC . H02K 9/19; H02K 11/33; H02K 5/20; H02K 5/225; H02K 7/006; H02K 5/22; H02K 7/00; B60K 6/26

USPC .................................. 310/64, 89, 71
See application file for complete search history.

(56) References Cited

U.S. PATENT DOCUMENTS

| | | | |
|---|---|---|---|
| 7,207,187 B2 | 4/2007 | Funahashi et al. | |
| 7,210,304 B2 | 5/2007 | Nagashima et al. | |

(Continued)

FOREIGN PATENT DOCUMENTS

| | | |
|---|---|---|
| CN | 205141934 U | 4/2016 |
| WO | WO 2018/003214 A1 | 1/2018 |
| WO | WO 2018/185061 A1 | 10/2018 |

OTHER PUBLICATIONS

International Search Report (PCT/ISA/210) issued in PCT Application No. PCT/US19/65173 dated Feb. 21, 2020 (three (3) pages).

(Continued)

*Primary Examiner* — Naishadh N Desai
(74) *Attorney, Agent, or Firm* — Crowell & Moring LLP

(57) ABSTRACT

A perimeter electric machine cooling arrangement includes a cooling conduit arranged to remove heat from an integrated housing containing an electric motor and a power inverter. The electrical connections between the electric motor and the power inverter are provided by flexible, pre-formed busbars that are arranged in pass over liquid cooling connections in the region between the electric motor and the power inverter. The integrated housing includes an intermediate cover over the electric motor and the power inverter portions of the housing, with a window through which the busbars can pass to reach the electric motor. The housing is further provided with an outer housing cover and seals that isolate the electric motor and the power inverter from the exterior environment and one another.

17 Claims, 4 Drawing Sheets

(56) References Cited

U.S. PATENT DOCUMENTS

| | | | |
|---|---|---|---|
| 7,567,053 B2 | 7/2009 | Hauenstein | |
| 7,969,052 B2 | 6/2011 | Ichise et al. | |
| 9,030,063 B2* | 5/2015 | Rawlinson | B60H 1/00278 |
| | | | 310/52 |
| 2003/0173839 A1 | 9/2003 | Torii et al. | |
| 2004/0090130 A1 | 5/2004 | Kaneko et al. | |
| 2005/0211490 A1 | 9/2005 | Shimizu et al. | |
| 2016/0056683 A1* | 2/2016 | Nakanishi | H02K 5/20 |
| | | | 310/54 |
| 2017/0302137 A1 | 10/2017 | Kim et al. | |
| 2018/0026493 A1* | 1/2018 | Jung | H02K 9/005 |
| | | | 310/52 |
| 2018/0262089 A1 | 9/2018 | Hatch | |
| 2019/0211827 A1 | 7/2019 | Kovacsik et al. | |

OTHER PUBLICATIONS

Written Opinion (PCT/ISA/237) issued in PCT Application No. PCT/US19/65173 dated Feb. 21, 2020 (24 pages).

* cited by examiner

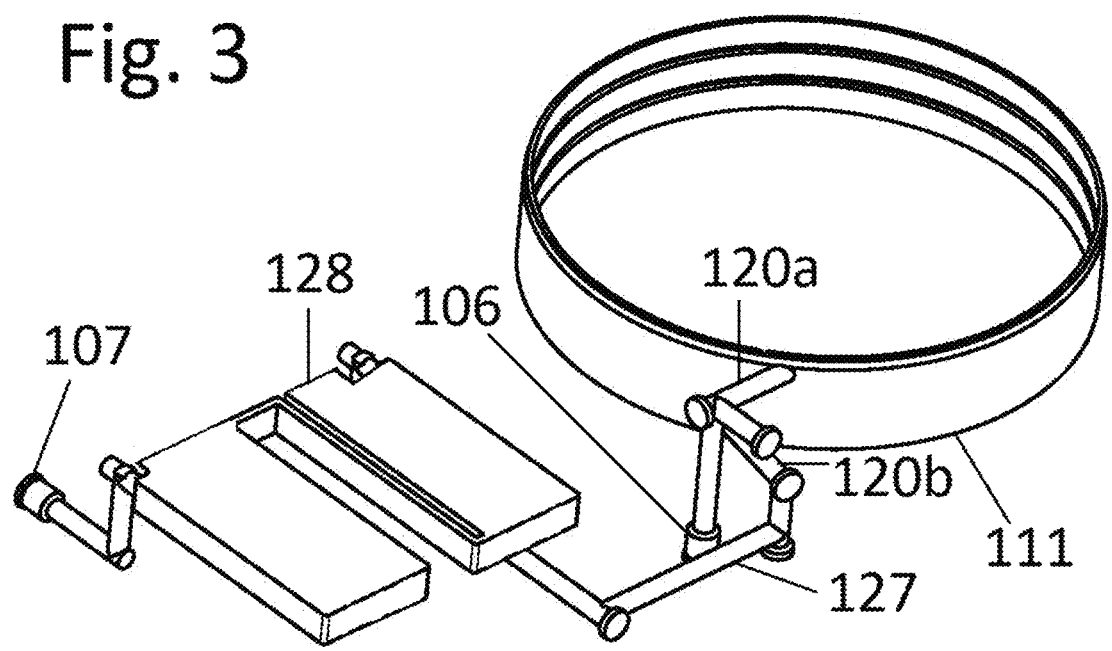

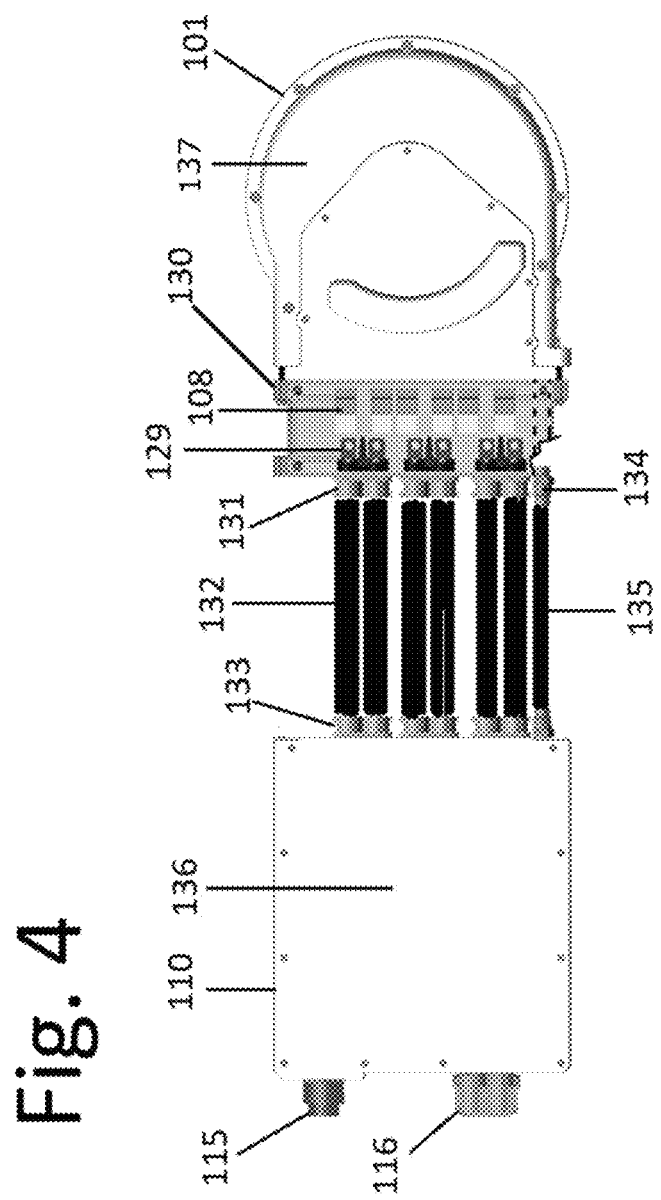

PERIMETER LIQUID-COOLED ELECTRIC MACHINE AND INTEGRATED POWER INVERTER

BACKGROUND OF THE INVENTION

The present invention relates to integrating an electric motor with a power inverter in applications such as electric motors used in certain hybrid electric vehicle electric generating and storage systems.

BACKGROUND OF THE INVENTION

Hybrid electric vehicles having an internal combustion engine combined with a motor-generator and an electrical energy storage system have been the focus of considerable attention in the automotive field, particularly in the field of passenger vehicles. Development of hybrid electric vehicle systems has only recently begun to attract significant interest in commercial and off-road vehicles, e.g., trucks and busses in Vehicle Classes 2-8, in earth-moving equipment and railroad applications, and in stationary internal combustion engine-powered installations.

Hybrid electric technologies offer numerous advantages, including improvements in fuel efficiency, reduction in internal combustion engine emissions and vehicle noise to help meet government regulatory requirements, improved vehicle performance and lower fleet operating costs. These advantages are obtained in significant part by hybrid electric systems' ability to recapture energy which would otherwise be wasted (such as mechanical energy from braking that would otherwise be dissipated as thermal energy to the environment) and return of the captured energy at another time when needed, such as powering vehicle components in lieu of using the internal combustion engine as the source of power or assisting in vehicle propulsion.

Typically, hybrid electric vehicle motor-generators have been arranged either independently of the internal combustions engine (for example, using separate electric motors to power and recover energy from front wheels while the engine provides propulsion power to the rear wheels), or have been coupled to the engine, for example being integrated into the "rear" of the engine (i.e., the end at which the engine's flywheel is located) or between the engine and the driveline to the wheels. This "behind the engine" position permits the motor-generator equipment to deliver torque directly to the vehicle's driveline and wheels, and to be directly driven by the driveline, for example, during regenerative braking events. Examples of the latter include flywheel-type motor-generators in which a conventional engine's flywheel is modified to serve as a motor-generator rotor and a concentrically-mounted stator is located around the flywheel, and separate electric motors arranged between the engine and the drive wheels. The so-called "two mode hybrid" transmission offered by General Motors in the 2009 GMC Silverado light-duty pickup included a transmission accommodating two electric motors for vehicle propulsion and electric energy generation.

Another form of adding a motor-generator to an internal combustion engine is the use of so-called starter-generators. This approach directly couples an electric motor to an engine to serve both as an electric generator (a function traditionally performed by a conventional belt-driven alternator) and as an engine starter, thereby reducing the weight and cost of duplicate alternator and starter electric motors. Such starter-generator installations are particularly useful in so-called engine stop-start systems which turn off the engine during periods when the vehicle is stopped to save fuel and reduce idling emissions. Starter-generators have been located behind the engine (for example, an appropriately engineered flywheel motor-generator may also be used as a starter), as well as being mounted at the front end of an engine where the starter-generator can drive a belt directly coupled to the engine crankshaft. An example of the latter system is the "belt alternator starter" system that was offered by General Motors as an option in the 2007 Saturn Vue sport-utility vehicle. These systems are very difficult to adapt to large engines, such as commercial vehicle diesel engines, because the electric motor must be larger to deal with the much higher torque demands of these heavy-duty engines, such as starting and operating various components (for example, an engine cooling fan can demand upwards of 50 KW of power, a load that requires a large amount of torque to drive the fan belt). Further, the belt drive in such an enlarged system would need to have the capacity to transfer the large levels of torque, something that may not be possible, or at least practical, because thicker and broader drive belts and pulleys sufficient to handle the torque demands may be so much larger and heavier than their automotive counterparts that they are weight, size and/or cost prohibitive.

A further approach to providing hybrid electric vehicle capabilities is described in U.S. patent application Ser. No. 15/378,139, now U.S. Pat. No. 10,220,830. In this approach, a motor-generator being arranged in a manner that requires little or no extension of the length of the front of the vehicle. As used in this description, the "front end" of the engine is the end opposite the end from which engine-generated torque output is transferred to the primary torque consumers, such as a vehicle's transmission and drive axles or a stationary engine installation's load, such as a pump drive. Typically, the rear end of an engine is where the engine's flywheel is located, and the front end is where components such as engine-driven accessories are located (e.g., air conditioning and compressed air compressors, engine cooling fans, coolant pumps, power steering pumps). While the discussions that follow focus primarily on commercial vehicle embodiments in which the engine crankshaft is aligned with the longitudinal axis of the vehicle, the present invention is not limited to front-engine, longitudinally-aligned engine applications, but also may be used with transverse-mounted engines (including transverse-mounted engines located at the front or rear of a vehicle) which may also have highly space-constrained environments in the region adjacent to the end of the engine opposite the flywheel end.

This front end motor-generator system has the motor-generator located in the front region of the engine. Preferably, the motor-generator unit includes co-located power inverter and control electronics. Such motor-generator units typically must be provided with a way to effectivity remove heat generated during electrical energy production, torque generation and power conversion in a space-, energy- and cost-efficient manner. In the case of a radial flux electric machine, most of the heat is dissipated through the stator, which is located concentrically to the rotor rotation axis.

One approach to cooling is to provide liquid cooling with cooling channels around the perimeter of the motor-generator over as much of the peripheral surface of the stator as possible. However, such a configuration creates a barrier around the electric motor through which it is difficult to route electrical connections that connect the electric motor to other components such as a power inverter. Similarly, in space-constrained application in which the power inverter is arranged at the side face of the electric motor, arrangement of cooling path inlets and outlets and electrical connections is problematic.

SUMMARY OF THE INVENTION

The present invention solves these and other problems by providing a liquid-cooled integrated motor-generator and power inverter system in which the power inverter is arranged in a plane perpendicular to the rotation axis of the electric motor, preferably in approximately the same plane as the electric motor, and radially outside of the electric motor. The connection between the output of the power electronic devices located inside the power inverter unit, nearest to the electric motor housing in one embodiment, using pre-formed flexible busbars that go above the cooling channels, then through a window in the upper motor housing and down to the terminal block, which is connected to the stator section. Flexible busbars allow for tight bends allowing compact component placement. The busbars are kept in place using an electrically non-conductive terminal block.

An advantage of the integrated motor and inverter design is the protection from environmental contamination provided by a combination of seals. There is a seal between the electric motor and the power inverter, while the top of the power inverter and the top of the motor housing have individual seals. Further, the tops of the electric motor and power inverter are covered with a single intermediate housing; then the top of the intermediate housing is sealed by a single cover plate. As a result, although the electric motor and power inverter are separate parts, the entire assembly is sealed against contamination.

The present invention may provide for the electric motor and the power inverter to have their own independent coolant circuits, but preferably are in communication through one coolant passage. This approach minimizes plumbing connections and leak points, with only two coolant connections in the assembly; an input port for the coolant located in the electric motor housing and an exit port is located in the power inverter housing. The cooling media may be, for example, a fluid of an internal combustion engine such as engine coolant, lubricating oil or transmission fluid.

In a further embodiment, if, due to for example space constraints, the power inverter may be remotely mounted, with a multi-purpose manifold block being provided to distribute electrical connections and coolant connections between electric motor and power inverter housings. In such an embodiment, the liquid coolant would travel between the electric motor and power inverter housings via a single passage, which may be easily configured with fittings and tubing.

The electric motor and the power inverter housing portions may be integrated or may be formed as separate housings, preferably configured so that the housing portions may be connected to one another, with cooperating fittings and connections for transfer of coolant and/or electric current and signals between the housings. More preferably, the motor and power inverter housing portions may be configured such that when the housing portions are assembled together, the cooperating coolant connections are simultaneously completed in a leak-free manner.

When embodied as separated housing portions, for example when space constraints would not permit immediately radially adjacent arrangement of the power inverter housing, the portions are connected by electrical and coolant conduits extending between the housings. In such embodiments, preferably the electrical connections at the electric motor housing side are either coupled to the busbars or extend directly to the busbar terminals. In embodiments in which coolant enters via an inlet at the electric motor housing and exits at the power inverter housing side, only a single coolant conduit is needed between the electric motor and power inverter housings, reducing costs and complexity by eliminating a coolant return line between the housings. The remotely-located embodiments also may have a multi-purpose manifold block attached to the electric motor housing or the power inverter housing. The manifold block would provide an interface, preferably with standardized connections, to facilitate assembly and installation of the electric motor and power inverter housing. When attached to the electric motor housing, the manifold block's electric connections would be coupled to the power inverter-side ends of the busbars.

While the present disclosure is primarily directed to use of the inventive perimeter-cooled electric machine in vehicle applications (in particular, in commercial vehicle applications), the electric machine is also well-suited for use with stationary engine installations (for example, standby diesel generators), off-road engine applications such as self-propelled construction equipment, and other engine applications. Similarly, while the invention may be used with an internal combustion engine coupled to the electric motor rotor, the use of an engine is not required, and alternative sources of rotor rotation energy may be coupled to the inventive perimeter-cooled electric machine.

Other objects, advantages and novel features of the present invention will become apparent from the following detailed description of the invention when considered in conjunction with the accompanying drawings.

BRIEF DESCRIPTION OF THE DRAWINGS

FIGS. 2 and 3 are views of the components of the electric machine in FIG. 1.

FIG. 4 is a top view of another embodiment of the present invention.

DETAILED DESCRIPTION OF THE DRAWINGS

Figure 1A:
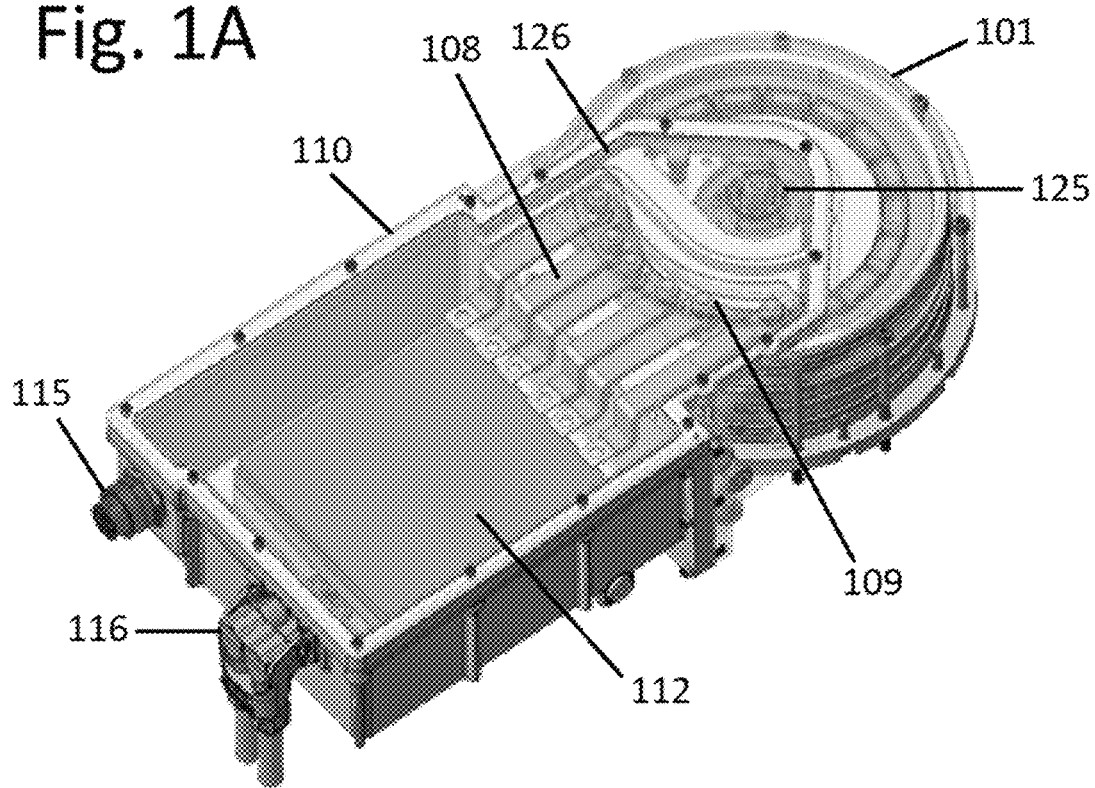
FIGS. 1A and 1B are an oblique view of an electric machine with electric motor liquid cooling in accordance with an embodiment of the present invention.
Figure 1B:
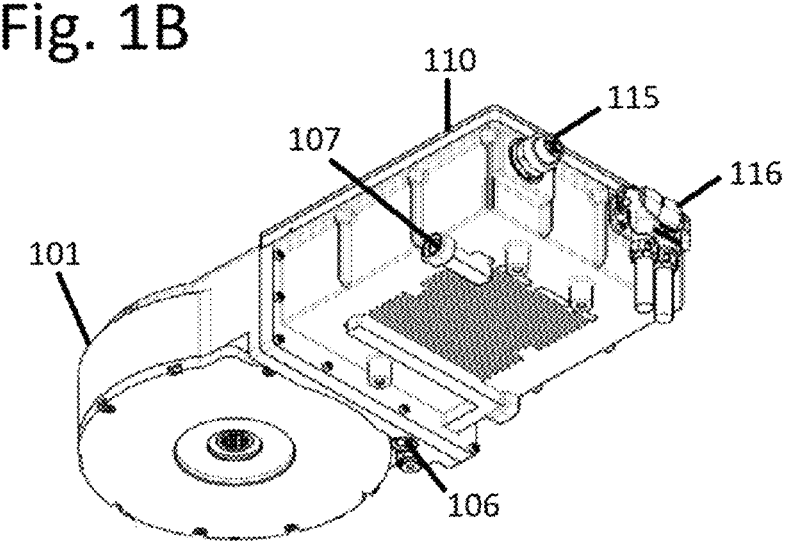

FIG. 1A illustrates an electric machine in accordance with an embodiment of the present invention in which an electric motor housing 101 and a power inverter housing 110 are integrated with one another, in this embodiment, by coupling separate housing portions to one another. The power inverter housing 110 is arranged in a plane perpendicular to the rotation axis an electric motor in to the electric motor housing 101. In FIG. 1A, the perpendicular plane intersects the motor housing, and specifically an electric motor rotor 102 and stator 103 located therein. The motor housing also contains a perimeter cooling array 111 arranged to receive heat from an outer peripheral surface of the stator 103. The specific configuration of the liquid cooling is not limited to the generally flat-tube configuration of cooling array 111, but includes any conduit arrangement effective to remove heat from the electric motor. Coolant inlet connection 106 and coolant outlet connection 107 (see FIG. 1B) are arranged at outer surfaces of the housing, and are in fluid communication with the cooling array 111. The cooling arrangements in this embodiment are discussed further, below.

Figure 2:
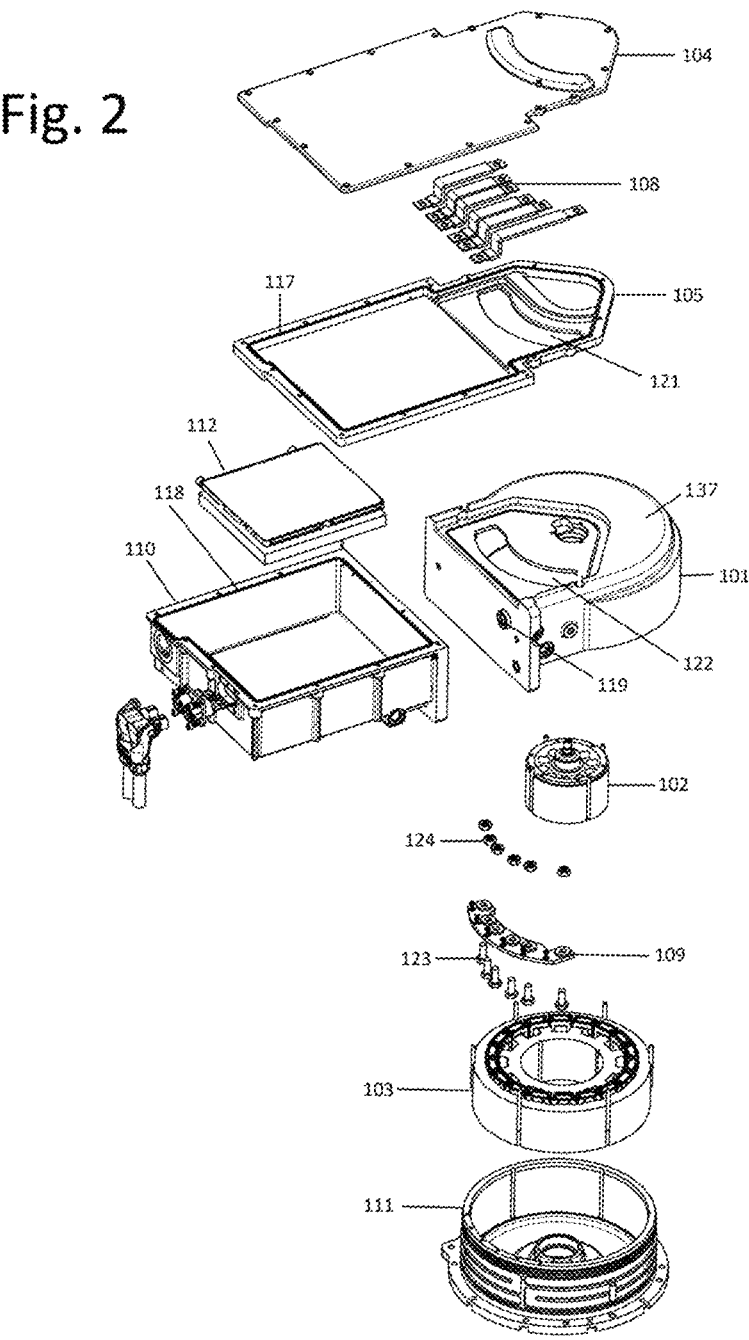

An intermediate housing cover 105 extends over both the electric motor and power inverter housings, and an outer housing cover 104 extends over and closes off the intermediate housing cover 105, as shown in FIG. 2.

The electrical connections between the electric motor and the power inverter are via pre-formed flexible busbars 108 extending from an electric motor end of the power inverter housing 110 toward the electric motor housing 101. The busbars are flexible and thin enough to pass over the liquid cooling tube array to the middle region of the electric motor housing 101, while being thick and broad enough to provide sufficient cross-section to handle the electric current and voltage anticipated to be carried by the busbars 108.

The busbars 108 make electrical connection to respective electric motor terminals, accessible via at least one passage 121 in the intermediate housing cover 105 between the power inverter housing 110 and the electric motor housing 101 (in this embodiment, via aperture 122 (aka window) in the electric motor housing cover 137), the terminals being guided and/or held in position by a non-conductive terminal block 109. The busbars 108 may be coupled to the electric motor terminal block 109 either by passing though the aperture 122 to reach the terminals, or by connection on the power inverter side of the intermediate housing cover to terminals 109 extending through the aperture 122.

In additional, as shown in FIG. 1A, lighter conductors such as a signal wire 126 to an electric motor position resolver 125 may be routed alongside the busbars 108 to the power inverter's control electronics 112. After the busbars 108 are installed, the outer housing cover 104 may be attached over the intermediate housing cover 105 to isolate the power inverter components and the electric motor components from outside contaminants. Sealing of the covered portions of the housings from both the environment and themselves is enhanced by use of housing cover seals 117-118 and a seal 119 between the electric motor housing 101 and the power inverter housing 110.

In this embodiment external electrical connections to the power inverter control electronics 112 are at the end of the power inverter housing 110. Because the use of the low voltage connection 115 and high voltage connection 116 for signaling and electrical energy transfer, respectively, are known, no further description of the routing of signals and electrical power to/from these connections is necessary.

In a further embodiment of the present invention, liquid cooling may also be provided for the power inverter components, as shown in FIGS. 2 and 3. While the electric motor and the power inverter may be provided with separate cooling circuits, in this embodiment the power inverter cooling circuit is a branch that receives and releases coolant via the inlet connection 106 and outlet connection 107, respectively. Specifically, coolant entering the housing through inlet 106 flows into the perimeter cooling array 111 via the upper leg 120a of the coolant passages 127, and after circulating through the array passes via lower leg 120b to the power inverter portion of the cooling circuit. The coolant then passes through heat exchanger 128 where the coolant absorbs heat from the power inverter electronics 112, and exits the housing through outlet connection 107. The coolant passages 127 may be embodied as tubes and/or as bores through solid materials.

With all of the coolant and exterior electrical connections being consolidated into two coolant connections and two electrical connections in this embodiment, potential sources of coolant leaks from the electric machine, as well as connection fitting leaks from the environment into the electric machine, are minimized.

FIG. 3 shows an exploded view of the primary components of a perimeter liquid cooled electric machine as associated assembly fasteners. In this embodiment, the electric motor housing 101 is coupled by fasteners to the power inverter housing 110. Alternatively, these housings may be integrally formed. The electric motor housing 101 receives the rotor 102, stator 103 and stator perimeter cooling array 111. In this embodiment, the cooling array 111 also includes the back cover plate of the housing 101. Similarly the power inverter housing 110 receives the power inverter electronics 112 (other electrical components in this housing are omitted for clarity).

Above the housings 101, 110 is the intermediate housing cover 105. The intermediate housing cover 105 includes a window 121, in this embodiment arc-shaped, in a location corresponding to an aperture 122 in the electric motor housing 101. The non-conductive terminal block 109 is similarly shaped so that it can provide an insulated pass-through of connections between the busbars 108 and the electric motor. In this embodiment the busbars 108 are coupled to bolts 123 by nuts 124, each of which is electrically isolated from the adjacent terminal, for example by grommets in the pass-through holes of the non-conductive terminal block 109. As in the previous embodiments, the busbars 108 are connected at their respective opposite ends to the power inverter electronics 112 passing over the side wall of the electric motor cooling tube array while maintaining a minimal profile in the direction of the axis of rotation of the rotor 102. After installation of the busbars 108, the outer housing cover 104 is secured over the intermediate housing cover 105. A resolver 125 for sensing the position and/or rotational velocity of rotor 102 is also protected from the environment within intermediate housing cover 105, with its signal conductor being routed along a side wall of the intermediate housing cover to the electronics 112. Suitable seals and/or sealing agents are provided at the housing and housing cover contact surfaces to seal the electric machine against ingress of liquids and other unwanted contaminants and seal the electric motor and power inverter housings from one another.

FIG. 4 shows another embodiment of the present invention in which the electric motor housing and the power inverter housing are separated, in this embodiment with the power inverter housing still in the plane perpendicular to the electric motor's rotor rotation axis. In this embodiment, the busbars 108 are coupled to corresponding terminals 129 of a manifold block 130. The manifold block 130 provides connections 131 for standardized electrical conduits 132 that extend between the electric motor housing 101 and electrical connections 133 at the power inverter housing 110. Also extending between the electric motor and power inverter housing portions from a fluid connection 134 is a coolant conduit 135 for transfer of coolant between the housings. In this embodiment the intermediate housing cover 105 that facilitates connection of the busbars 108 over the perimeter cooling array 111 extends only over the electric motor housing portion and the manifold block 130, while the power inverter housing portion receives a separate cover 136.

The foregoing disclosure has been set forth merely to illustrate the invention and is not intended to be limiting. Because such modifications of the disclosed embodiments incorporating the spirit and substance of the invention may occur to persons skilled in the art, the invention should be construed to include everything within the scope of the appended claims and equivalents thereof.

LISTING OF REFERENCE LABELS 101 electric motor housing
102 rotor
103 stator
104 outer housing cover
105 intermediate housing cover
106 coolant inlet connection
107 coolant outlet connection
108 busbars
109 non-conductive terminal block
110 power inverter housing
111 perimeter cooling array
112 power inverter control electronics
115 low voltage connection
116 high voltage connection
117 seal
118 seal
119 seal
120a, 120b upper and lower cooling branch
121 intermediate housing cover window
122 electric motor housing aperture
123 bolts
124 nuts
125 resolver
126 signal conductor
127 coolant passages
128 heat exchanger
129 manifold block busbar terminals
130 manifold block
131 electrical connections
132 electrical conduits
133 electrical connections
134 fluid connection
135 coolant conduit
136 power inverter housing cover
137 electric motor housing cover

What is claimed is:

1. A perimeter-cooled electric machine, comprising:
an electric motor having a rotor and a stator;
a perimeter cooling array arranged concentrically around the stator and being configured to receive heat from an outer peripheral region of the stator;
a power inverter; and
an electric machine housing,
wherein the electric machine housing includes
an electric motor housing configured to receive the electric motor and the perimeter cooling array,
a power inverter housing configured to receive the power inverter, the power inverter housing being arranged in a plane perpendicular to a rotation axis of the rotor that at least partially intersects the electric motor, and
electrical conductors between the electric motor and the power inverter which pass from a region of the electric motor housing inside an inner radius of the perimeter cooling array to the power inverter in a direction radially away from the rotor rotation axis, and
wherein the power inverter is arranged to be cooled by coolant flowing through the power inverter housing in a region away from the perimeter cooling array and the electric motor housing.

2. The perimeter-cooled electric machine of claim 1, wherein
the electrical conductors include busbars.

3. The perimeter-cooled electric machine of claim 2, wherein
the busbars are formed as flat conductor strips.

4. The perimeter-cooled electric machine of claim 3, further comprising:
a housing cover which includes an outer housing cover and an intermediate housing cover arranged between the outer housing cover and the electric motor housing,
wherein the busbars are coupled on a power inverter housing side of the intermediate housing cover to terminals of a non-conductive terminal block arranged in the apertures.

5. The perimeter-cooled electric machine of claim 4, wherein
the terminals are coupled on an electric motor housing side of the non-conductive terminal block to the electric motor.

6. The perimeter-cooled electric machine of claim 5, wherein
the perimeter cooling array has an axial height along the rotor rotation axis, and
the busbars pass over an end of the perimeter cooling array at an axial position outside of the axial height of the perimeter cooling array.

7. The perimeter-cooled electric machine of claim 6, further comprising:
an electric motor housing cover between the intermediate housing cover and the electric motor housing,
wherein
the intermediate housing cover extends at least partially over the electric motor housing; and
the electric motor housing cover is coupled to or integral with the perimeter cooling array.

8. The perimeter-cooled electric machine of claim 6, wherein
the perimeter cooling array includes a plurality of cooling tubes arranged about an array wall.

9. The perimeter-cooled electric machine of claim 8, wherein
the plurality of cooling tubes are configured to receive and withdraw a cooling medium, and
at least one cooling media inlet connection and at least one cooling media outlet connection are arranged in at least one region away from the busbars and non-conductive terminal block.

10. The perimeter-cooled electric machine of claim 9, wherein
the cooling medium is shared with a cooling arrangement of the power inverter.

11. The perimeter-cooled electric machine of claim 10, wherein
the at least one cooling media inlet connection and the at least one cooling media outlet connection are located at sides of the electric motor housing that are parallel to the rotor rotation axis.

12. The perimeter-cooled electric machine of claim 11, wherein
the at least one cooling media inlet connection is a single cooling media inlet connection and the at least one cooling media outlet connection is a single cooling media outlet connection, and
all cooling media for cooling the electric motor and the power inverter passes through the single cooling media inlet and outlet connections.

13. The perimeter-cooled electric machine of claim 12, wherein
   the cooling media is a fluid of an engine of a vehicle.

14. The perimeter-cooled electric machine of claim 1, wherein
   an axial height of the power inverter housing is within an axial height of the electric motor housing.

15. The perimeter-cooled electric machine of claim 14, wherein
   the axial height of the power inverter housing is centered on the axial height of the electric motor housing.

16. The perimeter-cooled electric machine of claim 6, wherein
   at least one of the busbars and the terminals pass through at least one aperture of the intermediate housing cover.

17. The perimeter-cooled electric machine of claim 1, wherein
   the electric motor housing and the power inverter housing are one of integrally formed, adjacent to and coupled to one another, and separated with electrical and cooling conduits extending between the electric motor housing and the power inverter housing.

\* \* \* \* \*